(12) United States Patent
Huang et al.

(10) Patent No.: US 7,359,677 B2
(45) Date of Patent: Apr. 15, 2008

(54) DEVICE AND METHODS FOR HIGH ISOLATION AND INTERFERENCE SUPPRESSION SWITCH-FILTER

(75) Inventors: Chun-Wen Paul Huang, Edison, NJ (US); William Vaillancourt, Methuen, MA (US)

(73) Assignee: Sige Semiconductor Inc., Ottawa, Ontario (CA)

( * ) Notice: Subject to any disclaimer, the term of this patent is extended or adjusted under 35 U.S.C. 154(b) by 476 days.

(21) Appl. No.: 11/149,143

(22) Filed: Jun. 10, 2005

(65) Prior Publication Data

US 2006/0281418 A1   Dec. 14, 2006

(51) Int. Cl.
*H04B 1/44* (2006.01)

(52) U.S. Cl. .................. 455/83; 455/287; 455/334; 455/277.1; 361/818; 361/816; 361/301.2; 343/847; 343/846

(58) Field of Classification Search ........... 455/424, 455/425, 550.1, 575.1, 561, 63.1, 83, 78, 455/67.13, 575.7, 562.1, 121, 296, 278.1, 455/275, 277.1, 283, 334, 333, 287; 343/847, 343/846, 851, 872, 829, 876; 361/818, 816, 361/301.2, 306.2, 306.3
See application file for complete search history.

(56) References Cited

U.S. PATENT DOCUMENTS 4,703,291 A * 10/1987 Nishikawa et al. ......... 333/202
5,293,141 A * 3/1994 Kobayashi et al. ......... 333/206
5,473,293 A * 12/1995 Chigodo et al. ............ 333/104

(Continued)

FOREIGN PATENT DOCUMENTS

EP   1 505 683 A1   2/2005

(Continued)

OTHER PUBLICATIONS

Wireless Net Design Line, "Optimizing WLAN Systems for Multi-Mode Mobiles", (http://www.wirelessnetdesignline.com/showArticle.jhtml?printableArticle=true&articleId=159402423), Mar. 17, 2005.

(Continued)

*Primary Examiner*—Edward F. Urban
*Assistant Examiner*—Charles Chow (57) ABSTRACT

Systems and methods are provided for a stacked die configuration of a high isolation switch and a rejection filter where transmit and receive signals are desired to have a high out-of-band rejection and a low loss band-pass region. In some aspects of the invention the high isolation switch is a double pole double throw switch modified to operate as a high isolation single pole double throw (SPDT) switch. In some aspects of the invention the high isolation switch is a conventional high isolation SPDT switch. The switch is mounted on a low profile rejection filter having metallization on a portion of an outer surface of the rejection filter. The metallization on the outer surface of the rejection filter provides an AC ground layer in close proximity to the switch that provides a short coupling path between the switch and the AC ground. The resulting switch-filter component also results in a smaller footprint than if the two devices were mounted individually and/or adjacently. The switch-filter component has applications in devices requiring high isolation between transmit and receive paths, for example use within a front-end module (FEM) of a single antenna, multi-radio device.

22 Claims, 6 Drawing Sheets

U.S. PATENT DOCUMENTS

| | | | |
|---|---|---|---|
| 5,525,942 A * | 6/1996 | Horii et al. | 333/134 |
| 5,742,212 A * | 4/1998 | Kato et al. | 333/104 |
| 5,990,065 A * | 11/1999 | Vinson et al. | 510/237 |
| 6,445,262 B1 * | 9/2002 | Tanaka et al. | 333/133 |
| 6,856,213 B2 * | 2/2005 | Tsurunari et al. | 333/133 |
| 6,862,436 B2 * | 3/2005 | Hayakawa et al. | 455/121 |
| 6,870,442 B1 * | 3/2005 | Suzuki et al. | 333/133 |
| 6,876,273 B2 * | 4/2005 | Harada et al. | 333/133 |
| 6,917,258 B2 * | 7/2005 | Kushitani et al. | 333/103 |
| 6,975,271 B2 * | 12/2005 | Adachi et al. | 343/700 MS |
| 6,995,630 B2 * | 2/2006 | Satoh et al. | 333/133 |
| 7,064,630 B2 * | 6/2006 | Hirabayashi et al. | 333/204 |
| 7,123,884 B2 * | 10/2006 | Nakakubo et al. | 455/81 |
| 7,183,875 B2 * | 2/2007 | Muto et al. | 333/103 |
| 7,221,922 B2 * | 5/2007 | Kemmochi et al. | 455/277.1 |
| 2003/0085774 A1 * | 5/2003 | Uriu et al. | 333/133 |
| 2003/0189910 A1 * | 10/2003 | Yamada et al. | 370/335 |
| 2004/0032706 A1 * | 2/2004 | Kemmochi et al. | 361/306.3 |
| 2004/0042186 A1 * | 3/2004 | Furukawa et al. | 361/760 |
| 2004/0266378 A1 * | 12/2004 | Fukamachi et al. | 455/188.1 |
| 2005/0026647 A1 * | 2/2005 | Li et al. | 455/552.1 |
| 2007/0018895 A1 * | 1/2007 | Bolin | 343/702 |

FOREIGN PATENT DOCUMENTS

| | | |
|---|---|---|
| JP | 2005-020140 | 1/2005 |
| JP | 2005-287085 A2 | 10/2005 |

OTHER PUBLICATIONS

SiGe Press Release, "SiGe Semiconductor Delivers Industry'S First Complete WLAN RF Front-End Modules for Cellular Handsets", (http://ww.sige.com/news/news_release.cfm?year=2005 &month=5), May 2, 2005.

2005 International Microwave Symposium, Workshop WDS-08, "Architectures and Designs of Wireless LAN Front-End Modules for Portable and high power WLAN Radios", Jun. 11, 2005.

2005 RFIC symposium, "Low Power Consumption 2.4 GHz WLAN Front-End Module for a Multiple Radio Handset", Jun. 12, 2005.

* cited by examiner

DEVICE AND METHODS FOR HIGH ISOLATION AND INTERFERENCE SUPPRESSION SWITCH-FILTER

FIELD OF THE INVENTION

The invention relates to devices used for high isolation and interference suppression in portable wireless devices, in particular switching components for such devices.

BACKGROUND OF THE INVENTION

With the advancements of electronic and wireless technologies, portable wireless devices such as cellular phones have become increasingly popular. New generation cellular phones integrate a great number of functionalities, such as gaming, personal data assistants (PDA), e-mail, digital cameras, general packet radio services (GPRS), global positioning systems (GPS), and Blue Tooth (BT). Further, incorporation of wireless local area network (WLAN) technology into smart phones appears inevitable. When integrating a WLAN radio into a compact multi-radio portable device, a design challenge is the reduction of transmit and receive interference between simultaneously operating radios.

Typically in WLAN radios two or more antennas are used to transmit and receive signals, wherein a different antenna is used for increasing the spatial diversity or utilizing a different portion of the radio spectrum. Therefore, in most WLAN radios double pole double throw (DPDT) switching is adopted for switching between the antennas. Spatial diversity provided by using multiple antennas increases probability of data recovery and avoids nulls caused by multi-path propagation. The distance between antennas is typically desirable to be less than 20% of a wavelength to ensure spatial diversity and reduce the effects of antenna coupling.

Figure 1:
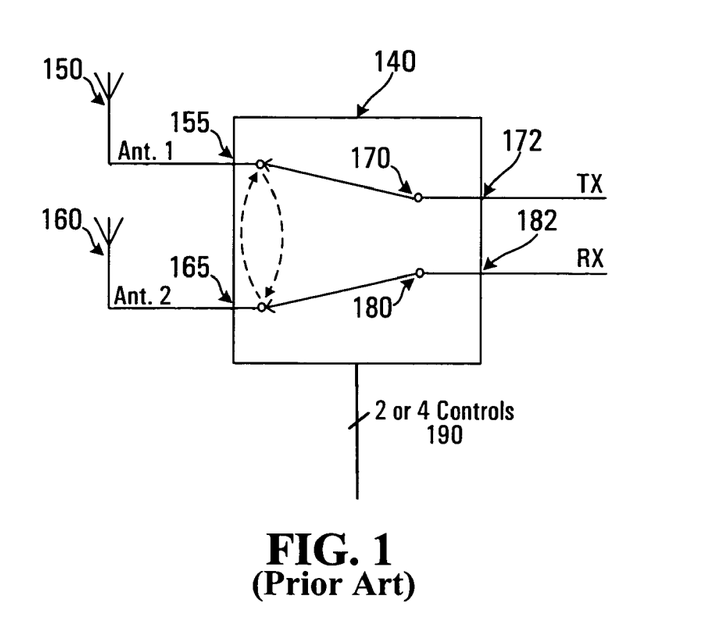
FIG. 1 is a schematic diagram of a double pole double throw (DPDT) switch in a conventional WLAN radio utilizing spatial diversity.

FIG. 1 shows a conventional DPDT T/R (transmit/receive) switch 140 for use in a WLAN radio utilizing spatial diversity. The DPDT switch comprises two switches that are simultaneously switched between different circuit paths. A first antenna 150 is connected to a first RF switch port 155. A second antenna 160 is connected to a second RF switch port 165. DPDT switch 140 is comprised of two single pole double throw (SPDT) switches, 170 and 180. The DPDT switch 140 has a transmit switch port 172 for supplying a signal to the switch 140 to be transmitted by the antennas 150,160 and a receive switch port 182 for providing a signal received from the antennas 150,160. SPDT switch 170 allows the connection either from the transmit switch port 172 to the first RF switch port 155 or the transmit switch port 172 to the second RF switch port 165. Similarly, SPDT switch 180 supports the connection either from the receive switch port 182 to the second RF switch port 165 or from the receive switch port 182 to the first RF switch port 155. Switching operations are enabled by 2 or 4 switch controls 190. Single switch control is also possible by using a parallel to series logic decoder.

Figure 2:
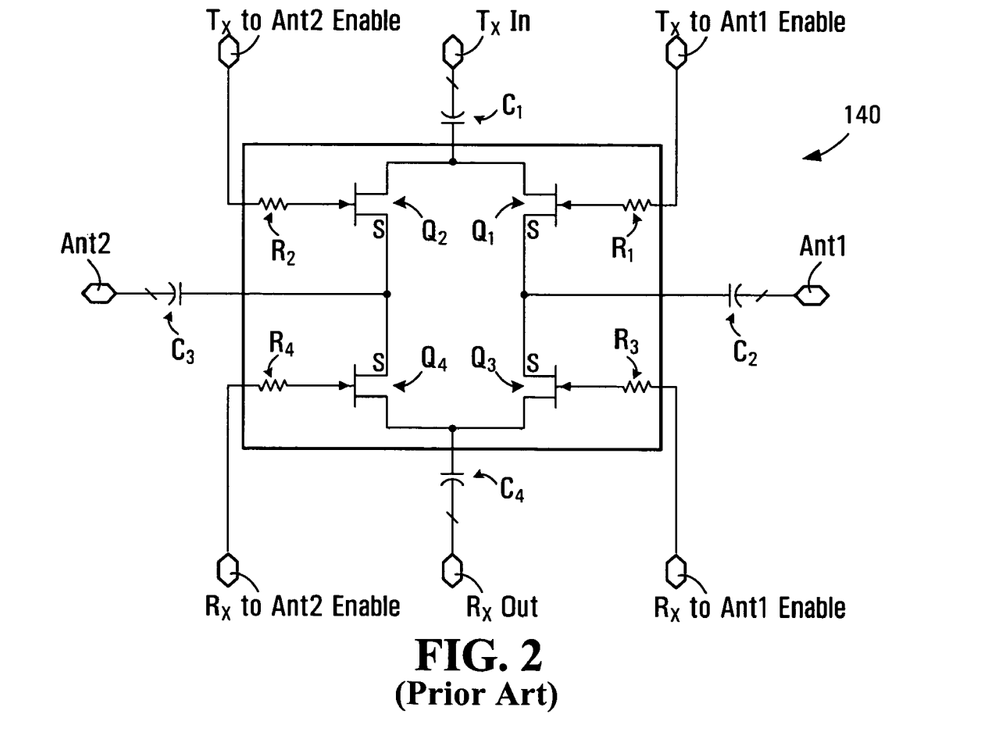
FIG. 2 is a circuit diagram of a conventional double pole double throw switch.

FIG. 2 shows a circuit diagram of the conventional DPDT T/R switch 140, in which FETs (field effect transistors) are used to implement the switching functionality. A transmitter input port (Tx In) is coupled through a capacitor C1 to a drain terminal of a first FET Q1. A source terminal of Q1 is coupled through capacitor C2 to a first antenna (Ant1). "Tx In" is also coupled though capacitor C1 to a drain terminal of a second FET Q2. A source terminal of Q2 is coupled through capacitor C3 to a second antenna (Ant2). A receiver output port (Rx Out) is coupled through capacitor C4 to a drain terminal of a third FET Q3. A source terminal of Q3 is coupled to Ant1. "Rx Out" is also coupled through capacitor C4 to a drain terminal of a fourth FET Q4. A source terminal of Q4 is coupled to Ant2. A transmit enable to Ant1 (Tx to Ant1 Enable) is coupled to a gate of Q1 through resistor R1. A transmit enable to Ant2 (Tx to Ant2 Enable) is coupled to a gate of Q2 through resistor R2. A receive enable to antenna 1 (Rx to Ant1 Enable) is coupled to a gate of Q3 through resistor R3. A receive enable to Ant2 (Rx to Ant2 Enable) is coupled to a gate of Q4 through resistor R4. By setting the transmit and receive enables appropriately for the respective FETs, it is possible to send a transmit signal to one of the two antennas, obtain a receive signal from one of the two antennas or transmit to one of the two antennas and receive from the other of the two antennas simultaneously.

Due to current size demands placed on cellular handsets there are a limited number of effective locations that are possible for locating more than one antenna if trying to implement a DPDT switch in the WLAN architecture. In addition, insufficient spacing between antennas not only causes a high antenna coupling, but also reduces the effectiveness of spatial diversity.

Portable wireless devices such as cellular radios utilizing time division multiple access (TDMA) and frequency division duplexing (FDD) functionality, for example GSM (Global System for Mobile Communications) and TDMA, can employ timing coordination between different radio operations, which avoids interference between radios and provides pseudo simultaneous operation. However, such time coordination cannot be applied to CDMA and other code/frequency division multiple access cellular radios. A true simultaneous operation of multiple radios can only be realized with low interference between radios.

SUMMARY OF THE INVENTION

According to a first aspect of the present invention, there is provided a stacked die configuration combination of a switch and a filter adapted for use in a wireless front-end module of a single antenna multi-radio terminal. The switch-filter includes a filter having an outer surface of which a portion is metallized and a first input/output port that is to be electrically coupled to an antenna when in operation. The switch-filter also includes a switch having a first input/output port electrically coupled to a second input/output port of the filter and a second input/output port electrically coupled to the metallized outer surface of the filter. The switch is mounted to the metallized outer surface of the filter and a common node is formed by the electrical coupling of the second input/output port to the metallized outer surface of the filter.

According to a second aspect of the present invention, there is provided a front-end module adapted for use in a device for transmitting and receiving communication signals which includes a switch-filter, circuitry for providing a transmit signal to the switch-filter and circuitry for accepting a receive signal from the switch-filter.

According to a third aspect of the present invention, there is provided a method for constructing the switch-filter by forming the stacked die configuration of the switch mounted on the filter.

The metallized outer surface of the filter may be a wraparound metallization that covers essentially all of the filter, with the exception of being electrically isolated from input/output ports of the filter. The metallized outer surface of the filter may alternatively be metallization on the top and bottom, that is respective opposite sides of the filter, for example the side the switch is mounted on and the side that is adjacent to a substrate upon which the filter is mounted.

The stacked die configuration allows the switch-filter to have shorter electrical couplings which aids in improving performance. The stacked die configuration also provides a smaller footprint for an associated module in which the switch-filter is used.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Using a single pole double throw (SPDT) switch and a single antenna is a more practical approach for a WLAN multi-radio architecture when it is desirable to have a small handset resulting in insufficient spacing for multiple antennas.

Figure 3:
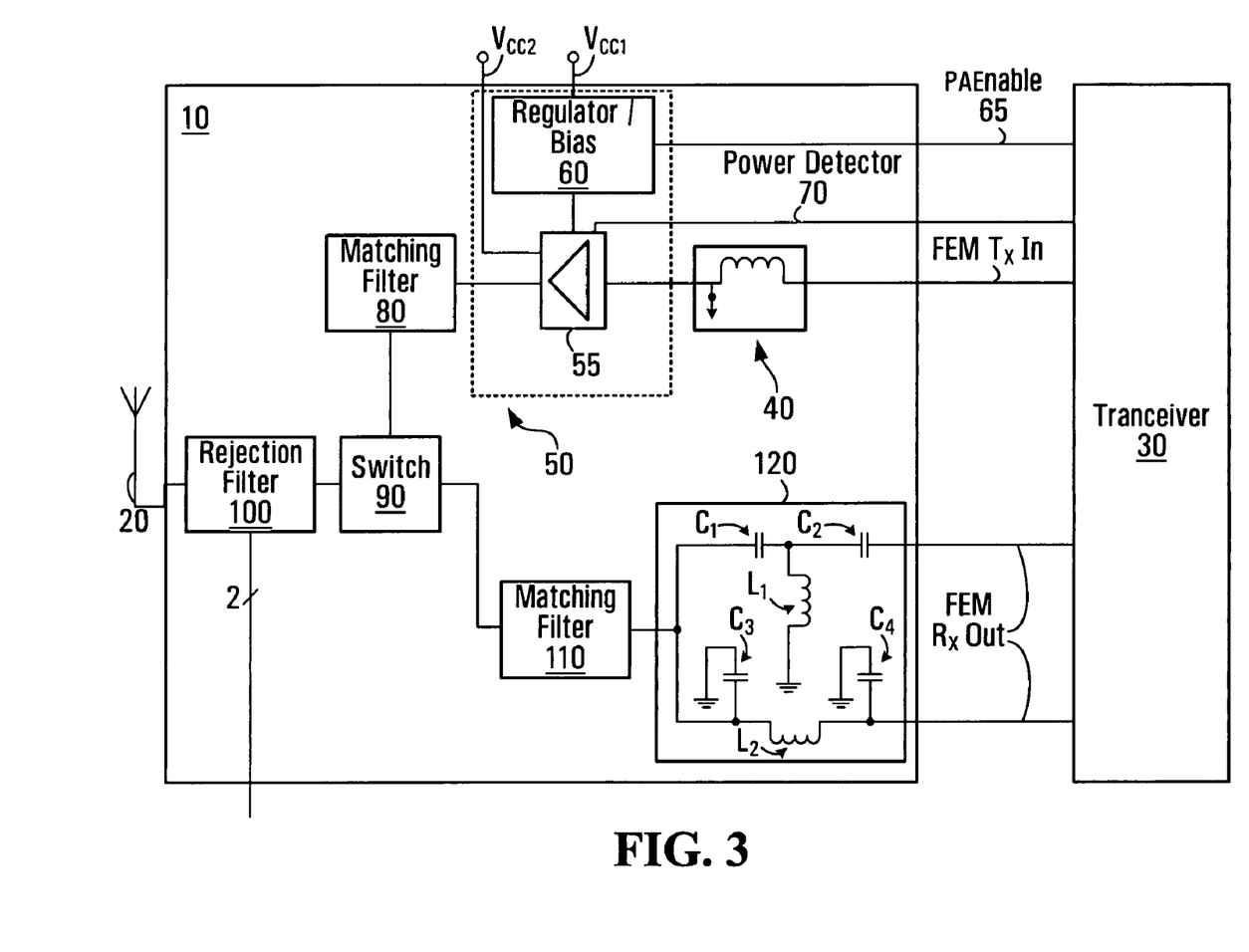
FIG. 3 is a block diagram of an architecture for a WLAN front-end module (FEM) of a portable wireless device according to an embodiment of the present invention.

FIG. 3 depicts an architecture for a WLAN front-end module (FEM), generally indicated at 10, of a wireless portable device. The FEM 10 is shown coupled to an antenna 20 and a transceiver 30.

Within the FEM 10 are both a transmit path and receive path. The transmit path includes a first matching filter 40, a power amplifier (PA) 50 with an amplifier 55 integrated together with a regulator 60 and a power detector (not shown), a second matching filter 80, a switch 90, and a rejection filter 100. The receive path includes the rejection filter 100, the switch 90, a third matching filter 110 and a balun 120. The transceiver 30 is coupled to the first matching filter 40 in the transmission path by line FEM Tx In. The balun 120 in the receive path is coupled to the transceiver 30 by lines FEM Rx Out. The amplifier 55 and the regulator 60 are powered by supplies Vcc2 and Vcc1, respectively.

In a preferred implementation of the FEM 10, the switch 90 is a SPDT T/R switch as only a single antenna is coupled to the FEM 10. This SPDT T/R switch may be a conventional high isolation SPDT (HISL SPDT) or a DPDT switch modified to operate as a HISL SPDT switch as described in more detail below.

The first, second and third matching filters 40, 80, 110 are optimized matched filters for aiding in improved isolation and detection of known pulse shapes within signals transmitted and received by the FEM 10. The matching filters 40, 80, 110 may also provide additional undesirable signal component rejection to aid in eliminating signal components outside the frequency bands of interest, for example cellular band noise. Preferably, the rejection filter 100 is a bandpass filter. Different types of matching and bandpass filters are known to those skilled in the art and it is understood that any type of matching and/or bandpass filters appropriate to the functioning of the FEM 10 may be used to implement the FEM module. More generally, it is to be understood that any type of filter or combination of multiple filters can be used to achieve the desirable filtering characteristics for the respective receive and transmit signals.

The transceiver 30 provides a signal to the matching filter 40 in the transmission path on line FEM Tx In, which the FEM 10 then provides to the antenna 20 for transmission. The balun 120 in the receive path provides a received signal from the antenna 20 to the transceiver 30 on lines FEM Rx Out. A balanced output of the balun 120 aids in providing common mode rejection.

The balun 120 is shown in the example of FIG. 3 to have two FEM Rx Out paths. A first path starting from an output of the matching filter 110 is coupled to a first capacitor C1. A second capacitor C2 is coupled in series with C1. C2 is coupled to transceiver 30. A first inductor L1 is connected to ground from a node between C1 and C2. A second path starting from the output of the matching filter 110 is coupled to a second inductor L2. L2 is also coupled to the transceiver 30. Within the balun 120, between the matching filter 110 and L2, a third capacitor C3 is coupled to the second path and is connected to ground. Also within the balun 120, between the transceiver 30 and L2, a fourth capacitor C4 is coupled to the second path and is connected to ground. In some embodiments, the balun 120 can be realized discrete SMT (surface mount technology) components and printed traces, or a lump integrated passive device die with selective wire-bond pads. The balun 120 can provide any impedance transform ratio by choosing proper L's and C's. When transceiver 30 has a single-ended receive port, the balun 120 can be easily transformed into a matching filter or a low pass filter by disconnecting C1 and choosing appropriate C3, L2, and C4. In addition, the discrete balun design can be also converted into a high pass filter with a cut-off frequency in the vicinity of 2.4 GHz by uninstalling C1 and replacing C3 and C4 with respective inductors and L2 with a capacitor to enhance the noise rejections at cellular frequency bands.

A PA Enable line 65 coupled between the transceiver 30 and the regulator 60 enables the regulator 60 to power the amplifier 55 when appropriate, that is when there is a signal to be transmitted. This functionality allows battery power to be conserved by not powering the amplifier 55 unless there is a signal to amplify the input to the FEM 10 on line FEM Tx In. A Power Detector line 70 coupled between the transceiver 30 and the amplifier 55 communicates whether the regulator 60 is "on" or not and also aids in power conservation.

It is to be understood that this is one example of a combination of components used in the transmit path for adequate power amplification of a signal to be transmitted. More generally, any suitable power amplifier could be used that provides adequate amplification and has desirable power utilization characteristics.

According to an embodiment of the present invention the switch 90 and the rejection filter 100 are combined in a stacked die configuration to form a switch-filter component. By stacking the switch on a rejection filter, which has a particularly advantageous feature of a metallization on its outer surface, the advantages of this feature to be described in more detail below, the switch-filter has the benefit of high transmit to receive isolation under all load mismatch conditions. Furthermore, the stacked die configuration switch-filter results in a component with high out-of-band rejection and a low loss band-pass region in a smaller form factor than if the two components are mounted individually and/or adjacently on a substrate. In a particular embodiment of the invention, a low profile semiconductor DPDT T/R switch is modified to operate as a SPDT T/R switch. In another embodiment, the switch 90 is a conventional HISL SPDT.

In order to better understand the benefits of the modified DPDT switch, it is helpful to first understand a conventional semiconductor HISL SPDT switch. A conventional high isolation SPDT T/R switch consists of two pairs of shunt-series FETs.

Figure 4:
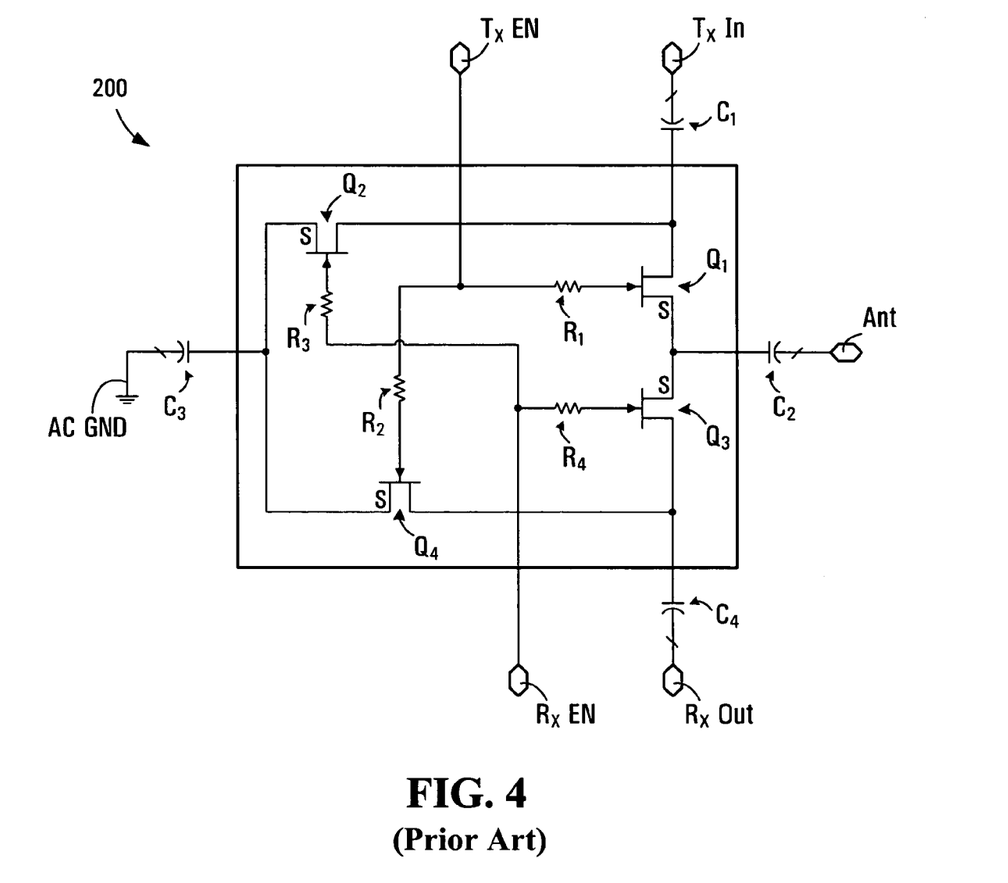
FIG. 4 is a circuit diagram of a conventional high isolation single pole double throw (HISL SPDT) switch.

FIG. 4 shows a circuit diagram of a conventional HISL SPDT T/R switch, generally indicated at 200. A transmitter input port (Tx In) is coupled through a capacitor C1 to a drain terminal of a first FET Q1. A source terminal of Q1 is coupled through capacitor C2 to an antenna (Ant). "Tx In" is also coupled though capacitor C1 to a drain terminal of a second FET Q2. A source terminal of Q2 is coupled to an AC GND connection point through capacitor C3. A receiver output port (Rx Out) is coupled through capacitor C4 to a drain terminal of a third FET Q3. A source terminal of Q3 is coupled to ANT. "Rx Out" is also coupled through capacitor C4 to a drain terminal of a fourth FET Q4. A source terminal of Q4 is coupled to the AC GND connection point through capacitor C3. A transmit enable (Tx EN) is coupled to a gate of Q1 and a gate of Q4 through respective resistors R1 and R2. A receive enable (Rx EN) is coupled to a gate of Q2 and a gate of Q3 through respective resistors R3 and R4. In some implementations, the AC GND connection point via C3 is often split into two separate AC ground paths with a series capacitor of half C3 capacitance at each path.

In operation, an active path has a first series FET turned-on and a first shunt FET turned off, for example Q1 on and Q2 off. An idle path has opposite operations and switch logic, Q3 off and Q4 on. Therefore, isolation between the active and idle paths is a function of ground inductance and an "on" resistance (R-on) of the idle path shunt FET Q4. To reduce insertion loss, the shunt FETs are usually chosen as having a smaller size compared with that of the series FETs. This increases R-on, lowers the isolation and reduces the linearity of the switch.

By way of comparison, the DPDT T/R switch used in the switch-filter is typically constructed using four series FETs of essentially the same size. To increase power handling and lower the R-on and insertion loss, the size of the FETs is large, for example in the range of 0.7 to 1 mm.

Figure 5:
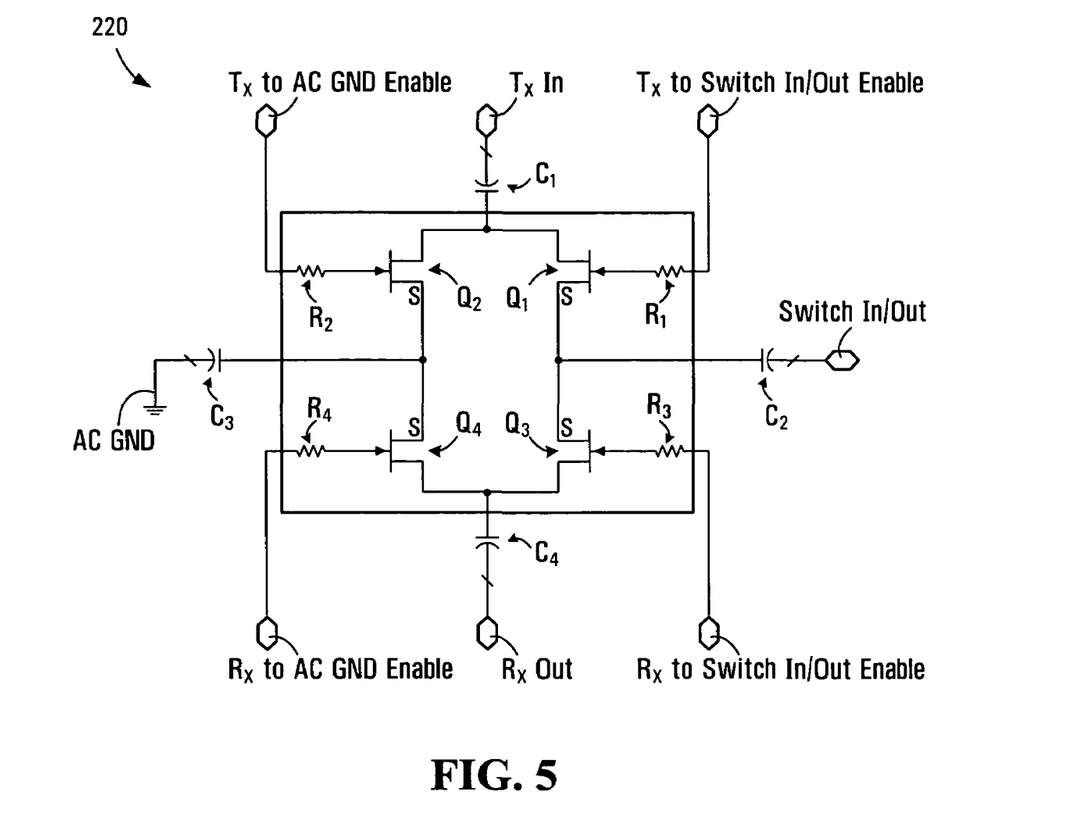
FIG. 5 is a circuit diagram of a modified DPDT switch according to an embodiment of the present invention.

FIG. 5 shows a circuit diagram of the modified DPDT T/R switch, generally indicated at 220. The operation of components (FETs, capacitors, resistors) of the modified DPDT switch 220 are similar to that of the DPDT switch of FIG. 2. The transmitter input port (Tx In) is coupled through capacitor C1 to the drain terminal of the first FET Q1. The source terminal of Q1 is coupled through capacitor C2 to a switch port (Switch In/Out). When used in a WLAN radio "Switch In/Out" is preferably coupled to a rejection filter and ultimately an antenna. "Tx In" is also coupled though capacitor C1 to the drain terminal of the second FET Q2. The source terminal of Q2 previously coupled to the second antenna in the DPDT of FIG. 2, is now coupled through capacitor C3 to an AC ground node (AC GND). The receiver output port (Rx Out) is coupled through capacitor C4 to the drain terminal of the third FET Q3. The source terminal of Q3 is coupled to "Switch In/Out". "Rx Out" is also coupled through capacitor C4 to the drain terminal of the fourth FET Q4. A source terminal of Q4 is coupled to AC GND. A transmit enable to "Switch In/Out" (Tx to Switch In/Out Enable) is coupled to the gate of Q1 through resistor R1. The "Tx to Ant2 Enable" previously identified in FIG. 2, is now identified as transmit to AC ground enable (Tx to AC GND Enable), which is coupled to the gate of Q2 through resistor R2. A receive enable to "Switch In/Out" (Rx to Switch In/Out Enable) is coupled to the gate of Q3 through resistor R3. The "Rx to Ant2 Enable" previously identified in FIG. 2, is now identified as receive to AC ground enable (Rx to AC GND Enable), which is coupled to the gate of Q4 through resistor R4.

The converted DPDT T/R switch 220 acts in a similar way to the above-described conventional SPDT 200. A transmit path from the "Tx In" port to the "Switch In/Out" port is active when "Tx to Switch In/Out Enable" and "Rx to AC GND Enable" are set to turn on Q1 and Q4 respectively and "Rx to Switch In/Out Enable" and "Tx to AC GND Enable" are set to turn off Q2 and Q3 respectively. Conversely, a receive path from the Rx Out port to the Switch IN/OUT port is active when "Rx to Switch In/Out Enable" and "Tx to AC GND Enable" are set to turn on Q2 and Q3 respectively and "Tx to Switch In/Out Enable" and "Rx to AC GND Enable" are set to turn off Q1 and Q4 respectively.

Table 1 provides a concise description of the operation of the modified DPDT switch.

TABLE 1

| Tx to Switch In/Out Enable | TX to AC GND Enable | Rx to Switch In/Out Enable | RX to AC GND Enable | FETs ON | FETs OFF | Switching |
|---|---|---|---|---|---|---|
| HI | LO | LO | HI | Q1 Q4 | Q2 Q3 | "Tx In" to "Switch In/Out" through path "Rx Out" to "Switch In/Out" open and "Rx Out" shunt to AC GND |
| LO | HI | HI | LO | Q2 Q3 | Q1 Q4 | "Rx Out" to "Switch In/Out" through path "Tx In" to "Switch In/Out" open and "Tx In" shunt to AC GND |

Isolation between the active and idle paths not only results from the turned-off series FET in the idle path, but also from the AC grounded shunt FET in the idle path. In some embodiments, isolation between the active and idle paths is measured greater than 26 dB from 2.4 to 2.5 GHz with a return loss better than 22 dB. When the idle input or output port, that is Tx In or the Rx Out is terminated with a VSWR 10:1 mismatch load, a resulting insertion loss variation of the active path is typically less than 0.03 db under all phase changes. Therefore, the idle path can be completely turned-off without degrading the performance of the active path, significantly reducing the power consumption. In addition, active path/idle path isolation also remains greater than 24 dB while the antenna port is severely mismatched with a 10:1 VSWR. This provides protection for receiver hardware while the antenna is severely mismatched.

The stacked die configuration provides a local ground (GND) plane to be in closer proximity to the HISL SPDT switch and shortens the coupling length between the switch T/R switch and ground. Shortening the coupling length, typically implemented by bonding wires, provides the benefit of reducing ground path inductance. By mounting the switch on a surface of the rejection filter that has wraparound metallization, or top and bottom metallization (with reference to a substrate upon which the filter is mounted, that is bottom being a side of the filter adjacent to a substrate) the stacked die configuration effectively shortens the coupling length. The coupling length is shortened due to the close proximity of the switch being mounted on the rejection filter and the fact that the surface metallization forms an AC ground via connection to the AC ground on a substrate the rejection filter is mounted on.

In addition to providing the AC ground which in some embodiments is used in modifying the DPDT switch to effectively operate as a HISL SPDT switch and in doing so reducing the effective coupling length of connections between the modified DPDT switch and the rejection filter, the use of metallization on the outer surface of the rejection filter enhances the operational characteristics of the rejection filter itself. For example, the grounding of the rejection filter improves repeatability of RF characteristics of the rejection filter. This metallization feature also provides the filter with the immunity of any possible performance variation/degradation caused by encapsulation or being placed close to other metallic structures. By facilitating the utilization of the stacked die configuration, the metallization on the outer surface of the rejection filter also provides an additional benefit of reducing the overall footprint of the FEM. This further enables a device in which the FEM is installed to be of smaller size as well.

Mounting the switch on the rejection filter also improves the insertion loss and matching condition characteristics of the switch-filter.

Figure 6:
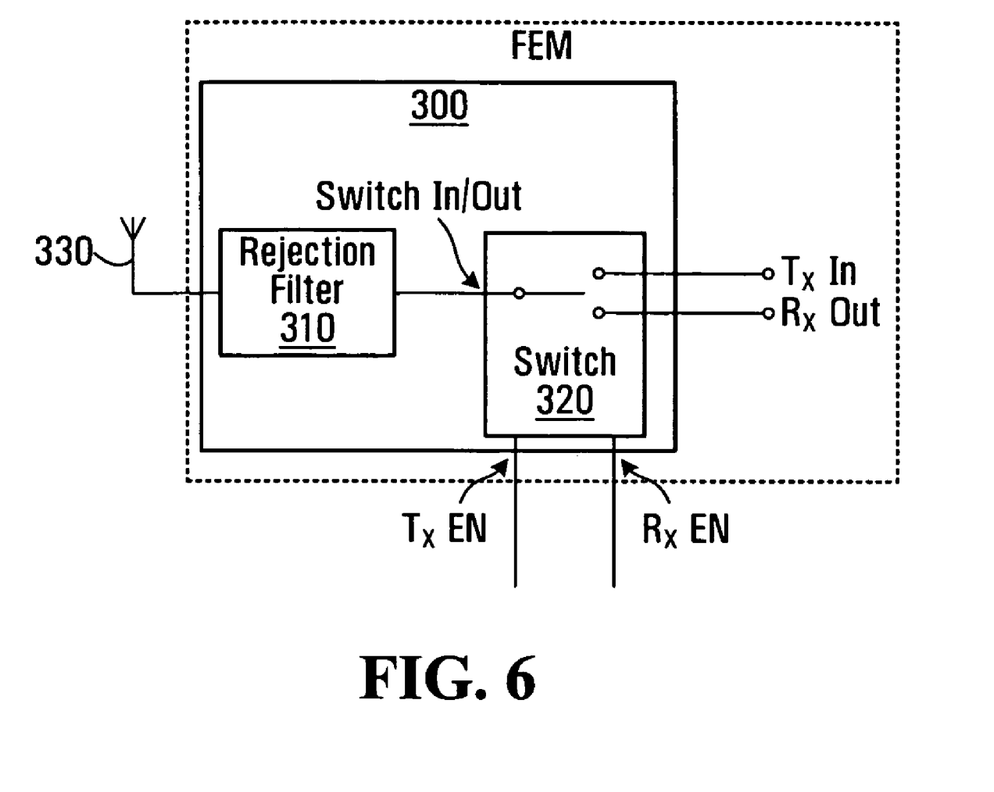
FIG. 6 is a block diagram of a switch-filter according to an embodiment of the present invention.

FIG. 6 shows a schematic of the stacked die switch-filter, generally indicated at 300, for use in an FEM similar to the FEM 10 of FIG. 3. The switch-filter 300 includes a rejection filter 310 and a HISL SPDT switch 320. The HISL 320 can be either a traditional semiconductor HISL switch design or a modified DPDT switch. A first input/output port of the rejection filter 310 is adapted to be coupled to an antenna 330. A second input/output port of the rejection filter 310 is coupled to a first input/output port (Switch In/Out) of the SPDT switch 320. A signal input port (Tx In) of the SPDT switch 320 is adapted to be coupled to hardware and/or circuitry providing a signal for transmission by the antenna 330. A signal output port (Rx Out) of the SPDT switch 320 is adapted to be coupled to hardware and/or circuitry for accepting a signal received by the antenna 330. The SPDT switch 320 also has two additional ports each adapted to receive a signal. A first additional port (Tx EN) receives a signal for enabling the switch 320 to operate in a transmit state and a second additional port (Rx EN) receives a signal for enabling the switch 320 to operate in a receive state.

In an embodiment of the invention wherein the SPDT switch 320 is a DPDT switch that is modified to operate as a HISL SPDT switch in the manner described herein, a second input/output port of the DPDT switch (for example of the type identified as Ant2 in FIG. 2) that would normally be coupled to a second antenna in a multi-antenna radio would be coupled to AC ground via the metallization on the outer surface of the rejection filter.

In an embodiment where a conventional HISL SPDT is used as the switch instead of a DPDT switch modified to operate as a SPDT switch, the metallized outer surface of the rejection filter provides a ground plane in close proximity of the HISL switch for proper grounding of the HISL switch when the HISL switch is stacked on the rejection filter.

More generally, stacking the switch on the rejection filter provides a basis for the metallized portion of the outer surface of the filter forming an electrical connection for a local AC ground in close proximity to the switch component, for example to be used as an electrical ground.

The filter may be a solid state component or a semiconductor component. More generally, the filter can be of any fabrication method that provides the size and filter characteristics for desired utility. An example of a bandpass filter that could be used in the switch-filter is a planar bandpass filter, Part Number EZFVQ50BµAIS, manufactured by Panasonic.

The SPDT switch is typically of semiconductor manufacture, but fabrication of the switch by other fabrication techniques are to be considered within the scope of the present application. An example of the high isolation SPDT that could be used is Skyworks Solutions AS225 or M/A Com MASW6010G. An example of a DPDT switch that could be modified to operate as a HISL SPDT switch for use in the switch-filter is a SiGe 077B01 or Skyworks Solutions AS236.

More generally, it is to be understood that other combinations of switches and filters used to construct a switch-filter as described herein are to be considered within the scope of the present application.

Figure 7:
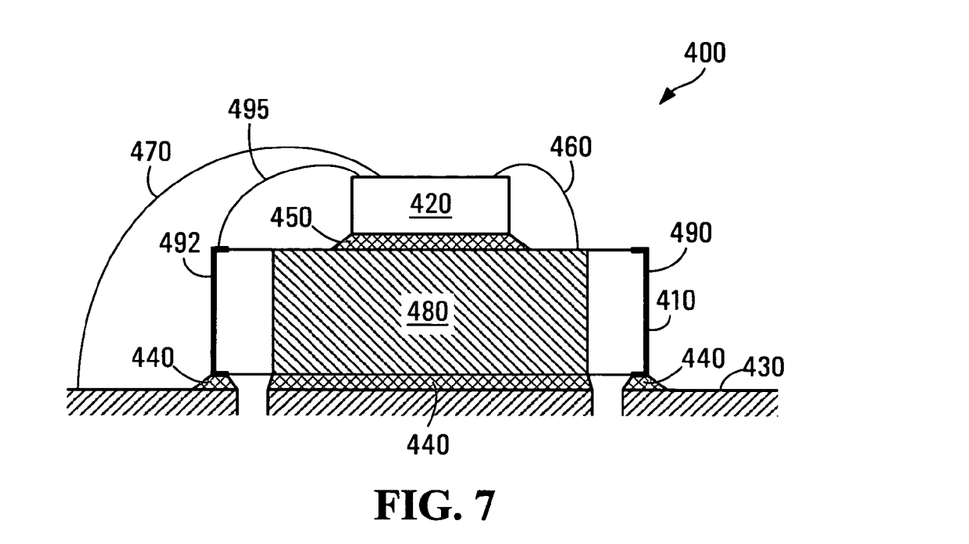
FIG. 7 is a side view schematic diagram of a switch-filter according to an embodiment of the present invention.

FIG. 7 is a side view schematic of a stacked die configuration switch-filter, generally indicated at 400, implemented on a substrate 430. A rejection filter 410 having an outer surface 480 of which a portion is metallized is mounted on the substrate 430, via an epoxy attachment 440 using a layer of conductive epoxy. The metallization 480 is preferred to be wraparound, i.e. extending across the top and bottom filter surfaces and the side surfaces which connect the top and bottom surfaces, but can be simplified to have only the metallization on the top and bottom filter surfaces. That is the surface of the side of the filter that the switch is mounted on and the surface of the side adjacent the substrate 430, respectively. Two filter input/output pins 490, 492 serving as the filter input/output ports are also coupled to printed traces of the substrate via epoxy attachment (440). The metallization is electrically isolated from the input/output pins 490, 492 to avoid a short circuit across filter. A DPDT switch 420 is mounted on the top surface of the rejection filter 410 and is attached to the rejection filter 410 using a layer of epoxy 450. A wirebond 460 is used to couple an input/output port of the switch 420 that would normally be coupled to a second antenna to the metallized outer surface 480 of the rejection filter 410 to provide the AC ground for modifying the DPDT switch 420 to operate as a HISL SPDT switch. A wirebond 495 is used to couple a first input/output pin 492 of the rejection filter 410 to an input/output port of the switch 420. Alternatively, the wirebond 495 can be landed on the pad connecting to filter port 492 on the substrate. Other wirebonds 470 as appropriate are used to couple other signal input and output ports of the switch, such as "Tx In" and "Rx Out" to the circuit board to provide connectivity to transmitting and receiving signal paths of the FEM and the appropriate transmit and receive enable port connections for the modified DPDT switch 420. While only one wirebond 470 is shown as an example to illustrate how the switch controls are coupled to the FEM, it is to be understood that there are as many wirebonds as desired to provide appropriate connectivity for operation of the switch 420 and filter 410.

FIG. 7 could also represent a conventional SPDT switch mounted on a rejection filter. A difference in this embodiment includes that the metallization of the outer surface of the rejection filter is electrically connected to a designated AC grounding point instead of a second input/output port as with the DPDT switch. There are also fewer transmit and receive enable ports to be connected.

More generally it is to be understood that the rejection filter 410 can be attached to the substrate mounting surface by any conventional means, for example conventional soldering techniques or conductive-gluing the rejection filter in place with epoxy as described above.

In some embodiments the substrate 430 upon which the switch-filter is mounted is the same substrate that the other components of the FEM are mounted on, for example the components of the transmit and receive signal paths described above with respect to FIG. 3. The substrate has bond pads and printed traces for facilitating electrical connection to the components of the transmit and receive paths.

Figure 8:
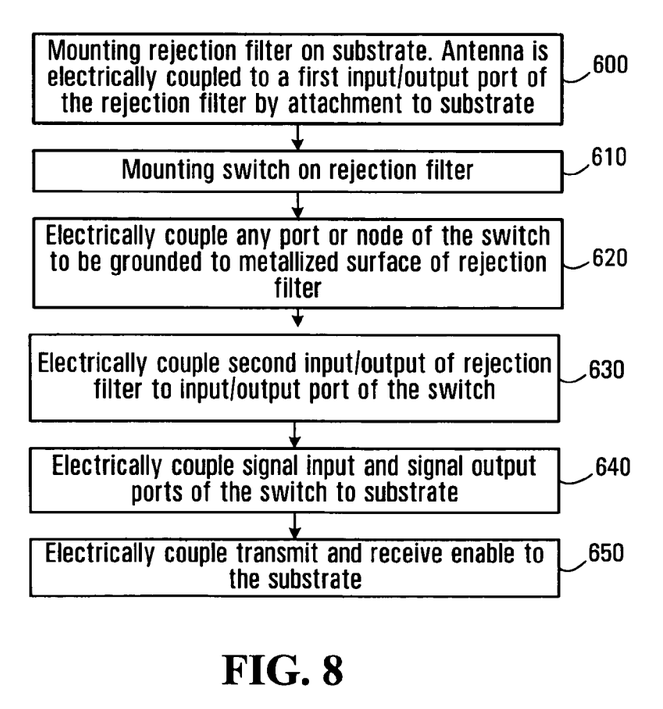
FIG. 8 is a flow chart of a method for assembling a switch-filter according to an embodiment of the present invention.

A method for assembling the stacked die configuration switch-filter will now be described with reference to FIG. 8. A first step 600 is mounting the rejection filter on the substrate. In this step, the two input/output pins of the rejection filter are coupled to the printed circuit substrate. One of the input/output pins is coupled to the antenna via traces on the substrate. In addition, the metallized surface of the rejection filter is also grounded. In step 610, the modified DPDT switch or HISL SPDT switch is mounted to the rejection filter. In the third step 620, any port or node of the switch that is to be coupled to an AC ground is so connected. For example, in the case of the DPDT switch, an input/output port normally coupled to a second antenna is coupled to the metallized surface of the rejection filter enabling the modification to allow the DPDT switch to operate as a HISL SPDT switch. In the case of using a conventional HISL SPDT, a designated AC ground node of the switch will be wirebonded to the metallized surface of the filter. In step 630, a second input/output port of the rejection filter is electrically coupled to an input/output port of the switch for providing a transmit signal to the filter after having passed through the switch or receive a received signal from the filter to be passed through the switch via the wire-bond on the top of the filter or on the pad the input/output port attached thereto. In step 640, a signal input port for providing a signal to be input to the switch and a signal output port for receiving a signal output from the switch are electrically coupled to the substrate. This enables connection from the switch filter to the transmit and receive paths formed on the substrate. In step 650, the transmit enable and receive enable are electrically coupled from appropriate ports on the switch to appropriate locations on the substrate.

It is to be understood that the order of the steps as described above used in assembling the switch-filter can be carried out in a different order than presented and the intended scope of the invention is still maintained.

As described above, in some embodiments the various electrical couplings are provided by wirebonding.

In some embodiments, the wirebonding used in assembling the switch-filter is performed by reverse bonding, where a ball is placed on a bondpad of the switch port to be coupled to the rejection filter, and then a stitch bond is performed on top of the ball for coupling to a bondpad of the rejection filter. Reverse bonding helps to reduce the loop height and maintain a low profile for the switch-filter when mounted in an FEM.

In some embodiments of the invention, blocking capacitors, such as capacitors C1, C2, C3, and C4 in FIG. 5 are also integrated into the switch. An example of such an embodiment is SiGe 922A19 switch. This simplifies construction and/or assembly of the switch-filter.

In some embodiments, a high-Q integrated passive device (IPD) for performing the filtering functionality is constructed with bondpads located on an appropriate surface of the IPD. The HISL SPDT (or modified DPDT) switch is then attached to the IPD using conventional flip chip technology. The ground connections of the IPD are connected to both the switch ground and substrate via wire-bonds or backside vias available in advanced IPD processes.

In some embodiments the switch-filter is part of a module, such as the FEM module wherein the entire module is encapsulated in a non-conductive material. The encapsulated module has terminals by which the module is electrically connected to a printed circuit board as part of a larger radio circuit. In some embodiments, the encapsulated module is equal to or less than 1 mm high, therefore the switch-filter, including wirebonds must be less than 1 mm to ensure that the switch-filter is properly encapsulated within the module.

While the switch-filter is described herein with respect to use in a WLAN FEM, it is to be understood that use of the switch-filter in other applications that require high out-of-band rejection and transmit/receive isolation is to be considered within the scope of the invention.

Numerous modifications and variations of the present invention are possible in light of the above teachings. It is therefore to be understood that within the scope of the appended claims, the invention may be practised otherwise than as specifically described herein.

The invention claimed is:

1. A device for use in a wireless front-end module for transmitting and receiving communication signals comprising:
   a filter component comprising an outer surface a portion of which is metallized, a first input/output port for electrical connection to an antenna, and a second input/output port;
   a switch component comprising an input/output port electrically connected to the second input/output port of the filter component, a signal input port for a transmit signal, a signal output port for a receive signal, and switch circuitry energizable selectively to switch the input/output port of the switch component into electrical connection with the signal input port or the signal output port, the switch circuitry including a node adapted to be AC grounded,
   wherein the switch component is securely mounted to the metallized portion of the outer surface of the filter component and the node adapted to be AC grounded is electrically connected to the metallized portion.

2. The device of claim 1, wherein the switch component is a high isolation single pole double throw (SPDT) switch and the node adapted to be AC grounded is an AC ground connection point.

3. The device of claim 1, wherein the switch component is a double pole double throw (DPDT) switch and the node adapted to be AC grounded is a second input/output port of the switch component that when AC grounded enables the DPDT switch to operate as a high isolation single pole double throw (SPDT) switch.

4. The device of claim 1, wherein the metallized portion of the outer surface of the filter component is comprised of a wraparound metallization that covers a first side of the filter component on which the switch component is mounted, a second side of the filter component on a side opposite to the first side, and third and fourth sides of the filter component that are opposite to one another and each connect the first side to the second side, and the metallization is electrically isolated from the first and second input/output ports of the filter component.

5. The device of claim 1, wherein the metallized portion of the outer surface of the filter component is comprised of metallization on a side of the filter component on which the switch component is mounted and a side opposite to the side on which the switch component is mounted and the metallization is electrically isolated from the first and second input/output ports of the filter component.

6. The device of claim 1, wherein electrical connection of at least one of the input/output port of the switch component to the second input/output port of the filter component and the node adapted to be AC grounded of the switch component to the metallized portion of the outer surface of the filter component is formed by wirebond coupling.

7. The device of claim 1, wherein the switch component is mounted on the filter component on a side opposite to a side used to mount the filter component to a substrate.

8. The device of claim 1, wherein a combined height of the switch component mounted on the filter component is less than or equal to 0.9 mm.

9. The device of claim 1, wherein the filter component is a bandpass filter.

10. The device of claim 1, wherein the switch component further comprises a plurality of blocking capacitors, a blocking capacitor of the plurality of blocking capacitors located at each one of the input/output port of the switch component, the node adapted to be AC grounded, the signal input port of the switch component, and the signal output port of the switch component.

11. A front-end module for use in a device for transmitting and receiving communication signals comprising:
  a switch-filter comprising:
    a filter component comprising an outer surface a portion of which is metallized, a first input/output port for electrical connection to an antenna, and a second input/output port;
    a switch component comprising an input/output port electrically connected to the second input/output port of the filter component, a signal input port for a transmit signal, a signal output port for a receive signal, and switch circuitry energizable selectively to switch the input/output port of the switch component into electrical connection with the signal input port or the signal output port, the switch circuitry including a node adapted to be AC grounded,
    wherein the switch component is securely mounted to the metallized portion of the outer surface of the filter component and the node adapted to be AC grounded is electrically connected to the metallized portion;
  a first circuit means for providing the transmit signal to the switch-filter electrically coupled to the signal input port of the switch component;
  a second circuit means for accepting the receive signal from the switch-filter electrically coupled to the signal output port of the switch component.

12. The module of claim 11, wherein the metallized portion of the outer surface of the filter component is comprised of a wraparound metallization that covers a first side of the filter component on which the switch component is mounted, a second side of the filter component on a side opposite to the first side, and third and fourth sides of the filter component that are opposite to one another and each connect the first side to the second side, and the metallization is electrically isolated from the first and second input/output ports of the filter component.

13. The module of claim 11, wherein the metallized portion of the outer surface of the filter component is comprised of metallization on a side of the filter component on which the switch component is mounted and a side opposite to the side on which the switch component is mounted and the metallization is electrically isolated from the first and second input/output ports of the filter component.

14. The module of claim 11, wherein the switch component is mounted on the filter component on a side opposite to a side used to mount the filter component to a substrate.

15. The module of claim 11, wherein electrical connection of at least one of the input/output port of the switch component to the second input/output port of the filter component, the node adapted to be AC grounded of the switch component to the metallized portion of the outer surface of the filter component, the first circuit means to the signal input port of the switch component, and the second circuit means to the signal output port of the switch component is formed by wirebond coupling.

16. The module of claim 11, wherein the filter component is a bandpass filter.

17. The module of claim 11, wherein the switch component further comprises a plurality of blocking capacitors, a blocking capacitor of the plurality of blocking capacitors located at each one of the input/output port of the switch component, the node adapted to be AC grounded, the signal input port of the switch component, and the signal output port of the switch component.

18. The module of claim 11, further comprising a non-conductive material to encapsulate the switch-filter, first circuit means and second circuit means of the module.

19. A method comprising:
  securely mounting a transmit/receive switch component on a filter component having an outer surface of which a portion is metallized;
  electrically connecting an input/output port of the switch component to a first input/output port of the filter component;
  electrically connecting a node adapted to be AC grounded of the switch component to the metallized portion of the outer surface of the filter component,
  wherein the metallized portion of the outer surface of the filter component forms an electrical connection for a local AC ground in close proximity to the switch component thereby improving transmit/receive isolation of the stacked combination of the switch component and filter component.

20. The method of claim 19, further comprising:
securely mounting the filter component on a substrate;
electrically coupling a second input/output port of the filter component to the substrate; and
electrically coupling the metallized portion of the outer surface of the filter component to an AC ground.

21. The method of claim 19 further comprising electrically connecting a signal input port and a signal output port of the switch component to locations on a substrate that are coupled respectively to:

a first circuit means for providing a transmit signal to the switch component;

a second circuit means for accepting a receive signal from the switch component.

22. The method of claim 19, wherein electrical connection of at least one of the input/output port of the switch component to the first input/output port of the filter component and the node adapted to be AC grounded of the switch component to the metallized portion of the outer surface of the filter component is formed by wirebond coupling.

\* \* \* \* \*